March 28, 1950
C. GILARDI
2,501,866
INTERNAL-COMBUSTION ENGINE FOR
PROPULSION OF BICYCLES
Filed March 23, 1946
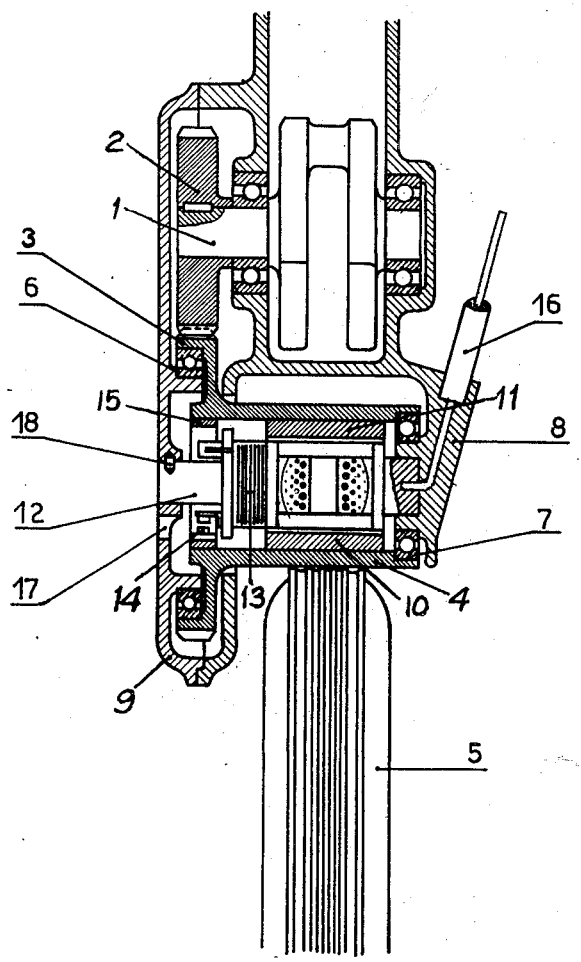
INVENTOR:
CARLO GILARDI
BY K. A. Mayr
ATTORNEY Patented Mar. 28, 1950

2,501,866

UNITED STATES PATENT OFFICE 2,501,866

INTERNAL-COMBUSTION ENGINE FOR PROPULSION OF BICYCLES

Carlo Gilardi, Milan, Italy

Application March 23, 1946, Serial No. 656,692
In Italy April 7, 1945

5 Claims. (Cl. 123—149)

The present invention relates to a power drive for bicycles comprising an internal combustion engine and a friction roller which is in contact with a tire of the bicycle, and its object is to overcome the difficulties connected with the application of an electric generator to such drives for producing electric current for ignition and auxiliary purposes and caused by lack of space and the high cost of complicated arrangements.

Incorporation of the electric generator in the fly wheel of the engine is not always possible because it requires increased axial dimensions.

In systems in which the engine is suspended in the vicinity of the pedal crankshaft and between the planes in which the pedal crank arms move, the axial dimensions of the engine must be smaller than the distance between said planes, and the aforementioned arrangement is unsuitable.

Limiting the transverse dimensions to permissible values and using a magneto and/or a separate generator makes the arrangement complicated, because provision must be made for the necessary control devices.

The object of the present invention is the provision of a system which solves the problem completely and rationally. The invention is characterized by the fact that the friction roller carries in its interior means for producing electric energy electromagnetically upon its rotation. These means, acting as a magneto, produce the electric energy for the spark plug or plugs of the engine, or they may produce the power needed for auxiliary services such as lighting, battery charging and the like. They may also be used for ignition, as well as for auxiliary purposes.

For better understanding but not for limiting the scope of the invention, an embodiment will be described hereafter in which the friction roller acts as a simple ignition magneto.

The single figure of the drawing shows a section extending longitudinally through the axes of the crankshaft of the internal combustion engine and of the friction drive roller of a system according to the invention.

Gear wheel 2 fixed to the engine output shaft 1 drives gear wheel 3 connected with roller 4. The latter adheres to tire 5 and transmits the engine power to the bicycle. Roller 4 is supported by bearings 6 and 7 whose stationary inner rings are supported by cover 9 and frame 8, respectively.

Magnet parts 10 and 11 are disposed inside the roller 4 and rotate therewith. Armature 12 is attached to the housing part 9 by means of a pin 18 and is stationary. It comprises the conventional primary and secondary windings, a condenser 13, and one of the distributor points 14. Opening of the points is effected by a cam on ring 15 which is suitably connected and rotates with wheel 3. Current for the spark plug is taken from one end of the stationary armature through the conduit 16. An opening 17 permits adjustment and timing of points 14.

Wheel 3 has twice as many teeth as wheel 2 and rotates at one half of the engine speed. If ring 15 has but one projection, the spark plug will give one spark for every two turns of the crankshaft, as required in four-cycle engines. For two-cycle engines, ring 15 has two projections set at 180° in order to produce one spark for each revolution of the crankshaft.

Having thus described by invention, what I claim is:

1. An internal combustion engine power plant for driving a bicycle, comprising, in combination, a housing, a crank shaft rotatable in said housing, a hollow drive roller rotatable within said housing and geared to said crank shaft and frictionally engaging and driving one of the wheels of the bicycle, and an electric generator, for generating the ignition current for said engine, disposed inside said drive roller and comprising an armature concentric with the drive roller and fixed to said housing and being stationary relative to said roller.

2. An internal combustion engine power plant for driving a bicycle, comprising, in combination, a housing, a crank shaft rotatably mounted in said housing, a gear wheel fixed to one end of said crank shaft and being disposed within the housing, a hollow drive roller rotatably mounted within said housing and frictionally engaging and driving a wheel of the bicycle, a gear wheel connected with one end of said roller, located within said housing and meshing with and being driven by the gear wheel on said crank shaft, and an ignition magneto system for said internal combustion engine, comprising field magnets and a distributor cam fixed to the inside of said roller and rotating therewith, a stationary armature and an electric condenser disposed concentrically within said roller and supported by said housing, and a stationary distributor point disposed inside said roller and supported by said housing in a position where it is passed by said cam upon rotation of said roller.

3. An internal combustion engine power plant as defined in claim 2, said housing having an opening adjacent to said distributor point for providing access to said point and to the distributor cam.

4. An internal combustion engine for driving a bicycle, including, in combination, an engine frame, an engine output shaft, a hollow drive roller rotatably carried by said frame driven from said shaft and frictionally engaging and driving one of the wheels of the bicycle, and an electric generator for generating ignition current for said engine disposed within and activated by rotation of said roller, said generator comprising a stator carried by said frame and a rotor carried by said roller.

5. An engine according to claim 4 in which the stator includes generator armature windings within, but spaced from the roller, and the rotor includes a permanent magnet arranged in the space between said roller and said armature.

GILARDI, CARLO.

REFERENCES CITED

The following references are of record in the file of this patent:

UNITED STATES PATENTS

| Number | Name | Date |
|---|---|---|
| 591,625 | Farnham | Oct. 12, 1897 |
| 643,095 | Holdrege | Feb. 6, 1900 |
| 1,191,287 | De Vaux | July 18, 1916 |
| 1,436,788 | Baker | Nov. 28, 1922 |
| 2,031,881 | Evinrude | Feb. 25, 1936 |

FOREIGN PATENTS

| Number | Country | Date |
|---|---|---|
| 2,579 | Great Britain | of 1898 |